United States Patent [19]
Elms

[11] Patent Number: 4,771,224
[45] Date of Patent: Sep. 13, 1988

[54] DIGITAL PULSE GENERATOR FOR CONTROLLED THYRISTOR SWITCHES AND MOTOR DRIVE EMBODYING THE SAME

[75] Inventor: Robert T. Elms, Monroeville Boro, Pa.

[73] Assignee: Westinghouse Electric Corp., Pittsburgh, Pa.

[21] Appl. No.: 39,205

[22] Filed: Apr. 16, 1987

[51] Int. Cl.$^4$ .............................................. H02P 5/40
[52] U.S. Cl. ..................................... 318/809; 323/244
[58] Field of Search ................ 318/809; 323/237, 244; 363/118, 96; 307/647

[56] References Cited
U.S. PATENT DOCUMENTS 3,611,097 10/1971 Joslyn .................................... 323/237
4,063,146 12/1977 Oliver .................................... 318/332

Primary Examiner—David Smith, Jr.
Attorney, Agent, or Firm—C. M. Lorin

[57] ABSTRACT

In a microcomputer-based multi-function thyristor-controlled AC induction motor drive, the microcomputer effectuates the several control functions of the motor drive during respective time intervals corresponding to the sequence of firing of the thyristors, and upon each new time interval, depending upon the required delay angle, firing is effected as a function of a residual angle in terms of a multiple of said time intervals, and the firing sequence is shifted by an amount of time intervals in relation to the integer number of such time intervals within such delay angle. As a result, firing of the thyristor is performed by the microcomputer without impeding control function determination and with improved response to change in the delay angle.

7 Claims, 12 Drawing Sheets

DIGITAL PULSE GENERATOR FOR CONTROLLED THYRISTOR SWITCHES AND MOTOR DRIVE EMBODYING THE SAME

CROSS-REFERENCED PATENT APPLICATIONS

The invention is related to copending patent application Ser. No. 858,132 filed Apr. 30, 1986 by N. G. Muskovac and entitled "Multi-Function Control System for an Induction Motor Drive". The cross-referenced patent application is hereby incorporated by reference.

The present invention is also related to copending patent application Ser. No. 008,973 filed Jan. 30, 1987 by R. T. Elms for "Motor Drive Energy Saver, now abandoned.

BACKGROUND OF THE INVENTION

The present invention relates to multi-function AC induction motor control, in general, and more particularly to microcomputer-based gating of such a control system.

Solid-state AC motor starter circuits are generally known. See for instance "Design and Application of a Solid-State AC Motor Starter" by John Mungenast in IEEE Transactions, vol. IA-12, No. 1, 1976, pages 39–42. A most commonly used mode of starting an induction motor is by reduced-voltage. See for instance "Reduced-Voltage Starting of Squirrel-Cage Induction Motors" by Frank M. Bruce, R. J. Graefe, Arthur Lutz and M. D. Panlener, in IEEE Transactions, vol. IA-20, No. 1, 1982, pages 46–55.

In an AC motor drive, start-up requires a progressive increase of the voltage applied to the motor, through a controlled gating of the thyristors of the associated static converter. This technique has been shown in U.S. Pat. Nos. 4,384,243 and 4,482,852, both of Nicholas G. Muskovac. These two patents are hereby incorporated by reference. Once the motor is running, there is a need to adjust further the gating of the thyristors in order to match loading conditions. For that purpose, gating of the thyristors has been dynamically controlled in order to achieve energy saving as typically shown in the afore-stated abandoned Elms patent application.. To this effect the delay angle of firing of the thyristors is increased (which means that the voltage applied to the motor is decreased) if both the motor voltage and the motor current (as sensed) are increasing or decreasing and, conversely, the delay angle is decreased (and the voltage to the motor increased) if motor voltage and motor current vary in opposite directions.

In the multi-function control system described in the N. G. Muskovac et al. cross-referenced patent application, control of the thyristors for an AC motor drive is effected from a common control input for the various functions involved in such a system, typically starter, energy saver, protection. With the complex functions now installed for dynamic control of a motor drive, the gate pulse generator should be able to respond with good accuracy, to adapt to frequency variations and to track immediately any change in the applied delay angle. This has been attempted by using computer techniques. In this respect, it is most desirable to be able to accommodate such complexity of response with the availability of a standard and inexpensive microcomputer.

Computer-based digital control of thyristors is known. See for instance U.S. Pat. Nos. 4,577,269 of A. Abbondanti and 4,427,933 of Paul W. Wagener et al. These two patents show solutions to the problem of determining with a microcomputer at the last moment the instant of firing for the thyristors, thereby allowing a fast response to change and leaving time for other utilizations of the microcomputer.

SUMMARY OF THE INVENTION

The present invention associates gate pulse generation for thyristor control of an AC motor drive with the complex functions of motor drive control, all combined within the operation of a microprocessor.

While so doing, the microprocessor effects the various tasks, such as starter, energy saving, and protection, and gate pulse generation is performed without impeding those functions, the digital pulse generation function according to the present invention requiring a minimum of the microcomputer resources.

According to the present invention, gating of the thyristors in response to a reference signal is effected without the aid of a comparator, of a ramp-intersect circuit, as generally done in the prior art. Instead, the thyristors are sequentially fired within line-synchronized successive and equal time intervals, the order of firing in the sequence being automatically shifted so as to select a pair of thyristors matching the required firing time interval, giving an instantaneous magnitude of the firing angle control signal. Such determinations are immediately performed and entirely by the microprocessor, which itself releases the triggering pulse for the selected thyristor pair. This approach clearly distinguishes over the solution proposed in U.S. Pat. No. 4,630,188 of K. E. Daggett, where the ramp-intersect method is used in a multi-zone context for the ramps.

DETAILED DESCRIPTION OF THE INVENTION

Figure 1:
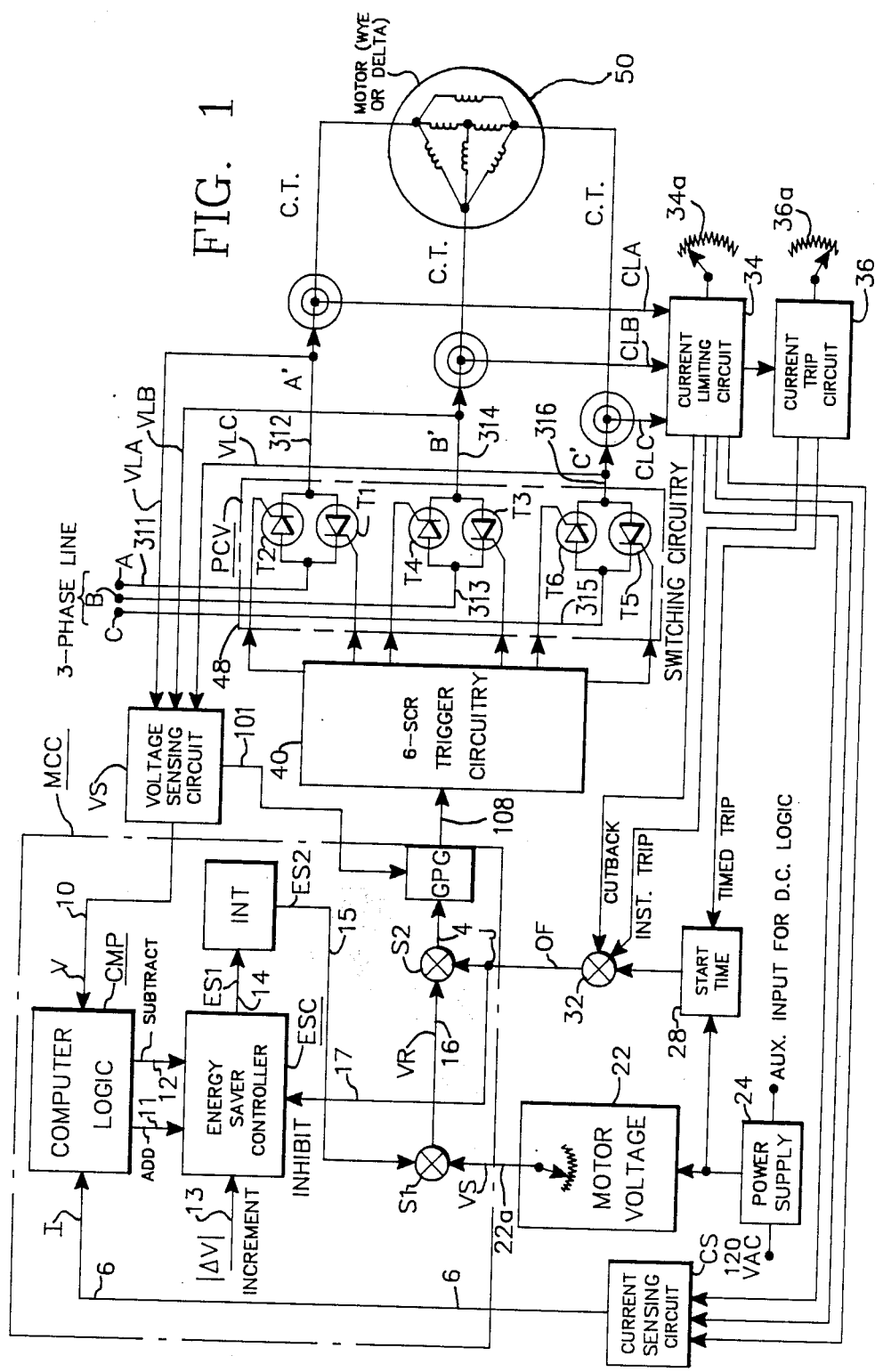
FIG. 1 is an overall block diagram of microcomputer-based AC motor drive according to the present invention.

Referring to FIG. 1, a multi-function motor drive control system, like the one shown in the cross-referenced Muskovac patent application, or in the cross-referenced and incorporated-by-reference Elms patent application, is shown in block diagram. According to the present invention, the control system is built around a microcomputer MCC performing the various functions of motor drive control and generating on line 4 a delay angle reference signal, characteristic of those functions. Also, according to the present invention, such firing angle reference signal is applied within the microcomputer to a gating pulse generator (GPG) section thereof for applying, via line 100, an enabling pulse for gating the appropriate thyristor in the firing sequence, as selected also by the GPG section of the microcomputer via line 110. As generally known, such triggering pulse is applied to a gate drive (generating a hard pulse and picket fence pulses for the oncoming thyristor) which is illustrated by the 6-SCR trigger circuit 40 in FIG. 1. Also, an interval counter is provided for performing the sequential timing function for sequential firing, also within the GPG section of the microcomputer, and applied via line 120 to the gating circuit.

Referring to FIG. 1, the invention is there disclosed in its preferred embodiment. The power converter is shown to include three pairs of antiparallel thyristors (T1-T6) responding by pairs, each one in relation to one phase line and for a corresponding polarity. With such a system, the voltage applied from phases A,B,C to phases A',B',C' of the motor depends upon the firing conditions of the thyristors (T1-T6).

Figure 2:
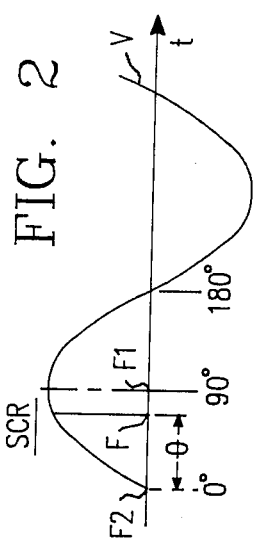
FIG. 2 is a curve illustrating the angle of firing of a thyristor in the motor drive of FIG. 1.

Referring to FIG. 2, the voltage V applied to the motor from motor terminal lines A',B',C' is to be considered in relation to the instant F at which incoming thyristor firing is initiated, namely at an angle $\theta$, as shown in FIG. 2. In practice, $\theta$ is chosen to be at 90° when the motor is unloaded producing a typical motor voltage of 45% of full voltage. At full load, $\theta$ is chosen to be 0°. For $\theta = 180°$, the thyristor has no conduction, and the voltage upon the motor is zero.

Referring to FIG. 1, the motor controller includes a voltage sensing circuit VS and current sensing circuit CS which, by line 10 for voltage V and by line 6 for current I, go to the computer logic CMP performing within the microcomputer the control logic for the energy saver controller ESC. Its effect upon the reference signal of line 4 is to add (line 11) and thereby to increase the delay angle, or to subtract (line 12) and thereby decrease the delay angle by increments of voltage V as derived from line 13. Adding is in order when both the voltage V and the current I are increasing, or decreasing. Subtracting is effected when V and I are varying in opposite directions. This is as explained in the afore-mentioned Elms patent application.

Motor currents are also sensed from motor phases A',B',C' by lines CLA, CLB, CLC and inputted into a current limiting circuit 34 which triggers a current trip circuit 36. A motor voltage adjust reference and a ramp circuit 22 provide a starter signal VS applied to a summer S1, also responsive from line 15 to the energy saver command. The resulting signal on line 16 is a reference voltage used to control, via summer S2 and line 4, the gating of the trigger circuit 40. The ramp circuit is adjusted by the operator setting of potentiometer 22a, and it adjusts the reference VS in relation to a power supply 24. Current limiting, set by the operator upon potentiometer 34a, permits to limit "in rush" current during start-up, while producing cutback on summer 32, by line OF onto summer S2. Timed trip is provided by circuit 36, via the start time circuit 28, upon the detection of an overload, and instantaneous tripping is provided as well, all such control loops ending onto summer S2. A more general and specific description of the starter and energy saver controls is provided in the incorporated-by-reference U.S. Pat. No. 4,384,243.

As in the multi-function control system of the incorporated-by-reference Muskovac patent application, all the afore-stated modes of operation (starter, energy saver, protection) are translated into an overriding control signal on line 4 which determines the delay angle for the thyristors being triggered for conduction by the 6-SCR trigger circuit 40. Motor 50 is supplied with AC current derived from the 3-phase lines A,B,C, via SCR's arranged by pairs in opposite directions of conduction: illustratively, thyristors (T1,T2) are between line 311 for phase A and line 312 for phase A'; (T3,T4) are between line 313 for phase B and line 314 for phase B'; and (T5,T6) are between line 315 for phase C and line 316 for phase C'; thyristor T1 being oriented from the load to the A line and thyristor T2 from line A toward the load. The same relationship existing in the same order for the two other pairs of thyristors.

Figure 3:
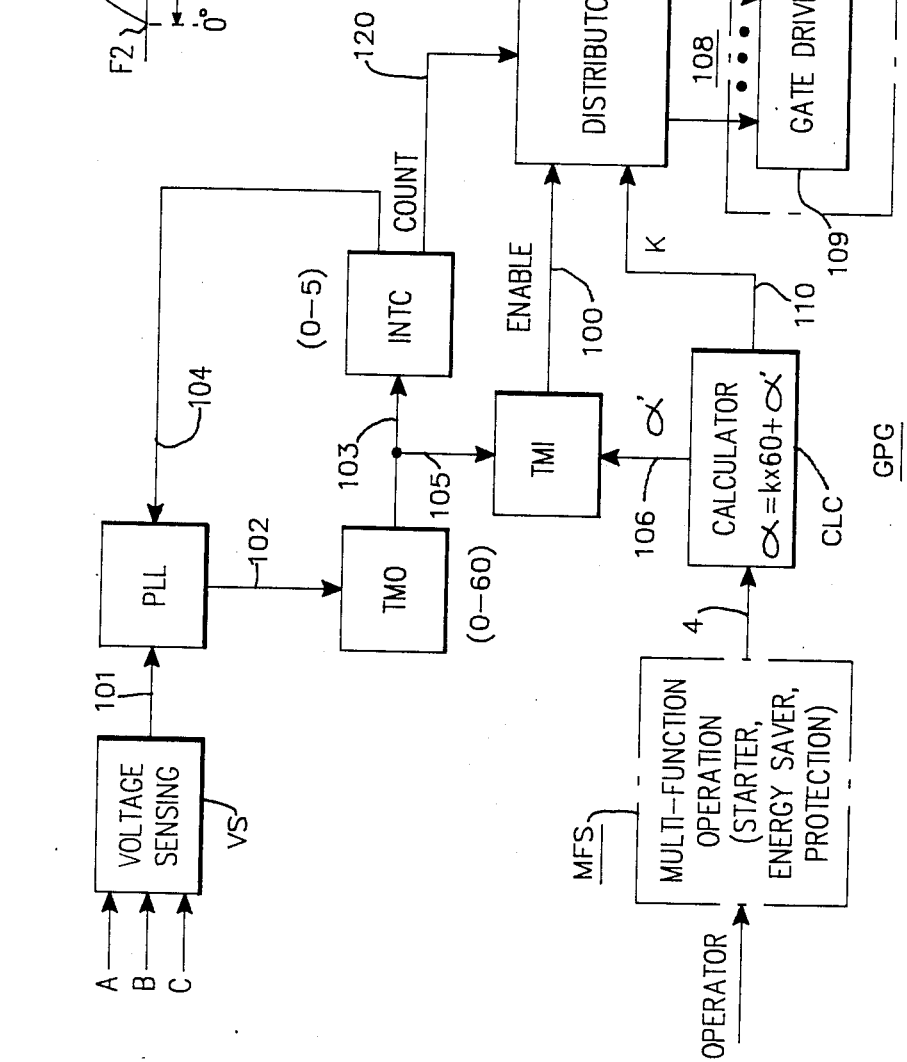
FIG. 3 is a block diagram illustrating the gate pulse generator section of the motor drive of FIG. 1.

Referring to the gate pulse generator section GPG of FIG. 3, the delay angle $\alpha$, applied as a reference voltage on line 4, is first converted, within a calculator circuit CLC, into a clock unit count and used, as such, therein to generate on line 110, (in accordance with the equation $\alpha = kx60 + \alpha'$) a count k in the same clock units representing the integral number of 60 degrees intervals contained in the delay angle $\alpha$, and concurrently to generate on line 106 a signal representing the residual delay angle $\alpha'$, after all whole 60 degree intervals have been removed. The GPG section of the microprocessor includes a timer TM1 used to generate in the same clock units, on line 100, an enabling pulse for the gating of the gate drive within the trigger circuit 40. Distributor 107 within the triggering circuit 40, as illustrated, responds to the enabling signal of line 100, and uses the k signal, derived on line 110, to provide the code instructions defining the required pair of thyristors in the firing sequence at the moment the firing command is triggered by the enabling signal of line 100.

Figure 4:
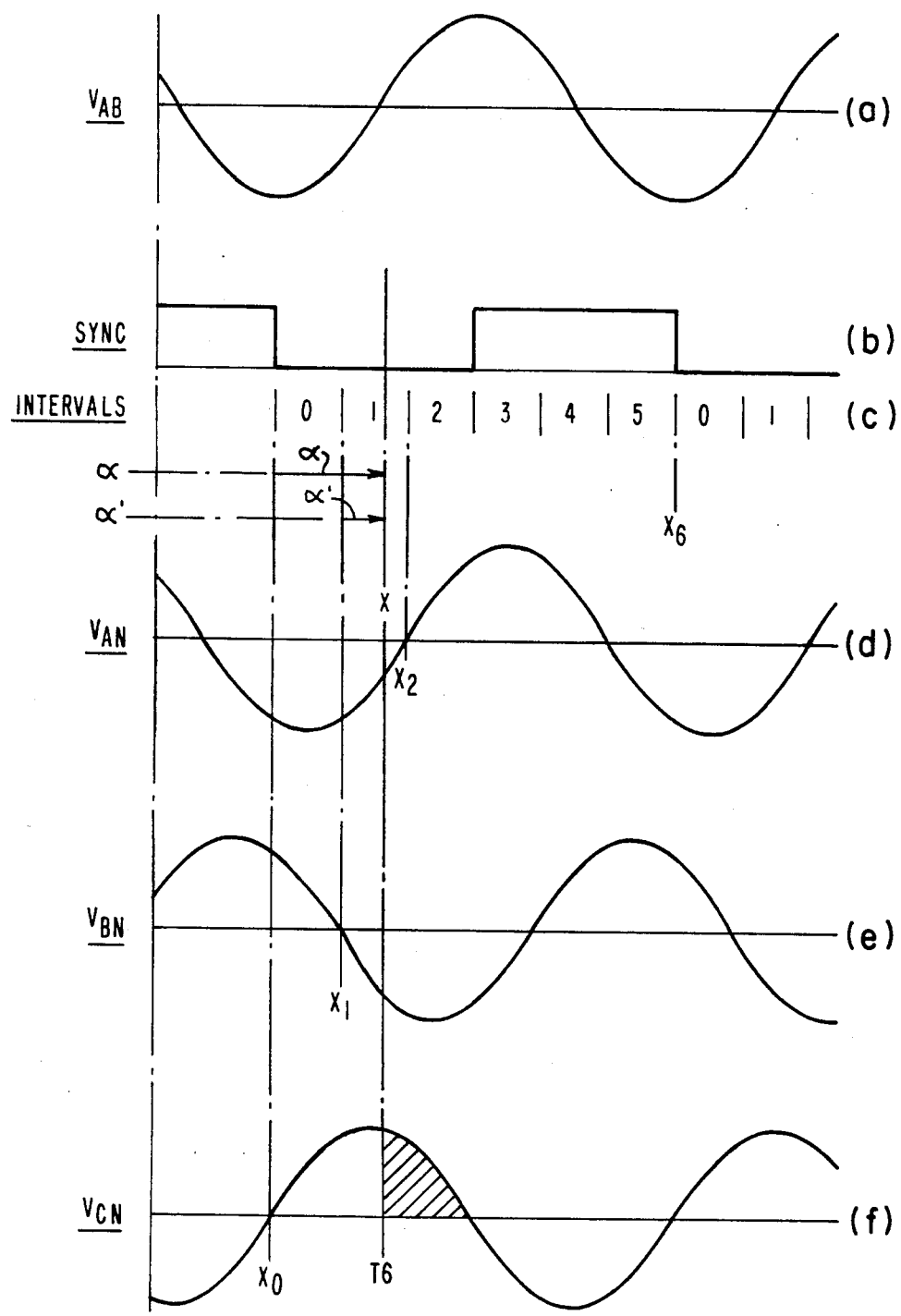
FIG. 4 illustrates with curves the time relation of the controlling delay angle and of the residual angle used to fire a thyristor in the proper sequence order, according to the present invention.

Referring to FIG. 4, the fundamental voltage wave of the ABC lines power supply is illustrated as the line-to-line voltage $V_{AB}$. A phase-locked loop (shown in FIG. 3) detects the zero-crossing points as they occur in one direction, successively. The reference signal of line 4 (FIGS. 1 and 3) at a given instant corresponds to a delay angle $\alpha$ (FIGS. 4 and 5) counted from an initial instantaneous electrical angle along such fundamental voltage wave, defined in relation to the detected zero-crossing point. The delay angle $\alpha$ (as shown in FIG. 4) may vary from zero electrical degrees (corresponding to a minimum phase delay for firing the incoming thyristor, which delay angle of zero degree corresponds to maximum conduction or maximum voltage) to a maximum delay angle (corresponding to minimum voltage for the motor). Thus, during start-up the phasing of the delay angle $\alpha$ (defined by the signal of line 4) is decreased quasi-linearly from its maximum value towards zero until a maximum operating voltage is achieved. There is a practical range for the delay angle $\alpha$ which is from zero to 180 electrical degrees (end-stop, as generally known). After start-up, the energy saver is in operation and the phase angle is varying according to V and I as above-stated.

For a given delay angle $\alpha$ (requested on line 4) at a given instant, section GPG of the microprocessor causes the right triggering to occur upon the trigger circuit 40. Assuming that the triggering instant occurs for one pair of thyristors, it occurs for all other pairs in successive order. The six pairs of thyristors are each associated with one particular time interval of 60 degrees along the fundamental waveform. Depending upon the size of the delay angle α, upon the instant of firing, the firing sequence may be concurrently shifted by one, two, or three such 60 degree intervals, (within the operative range for firing, namely from zero to the end-stop, at 180 degrees). It is also understood that, for such given value of the delay angle, all the thyristors are being fired at 60 degree intervals in succession, thus, within the period from one zero-crossing to the next, according to the sequential order defined by distributor 107 of FIG. 3.

Figure 7:
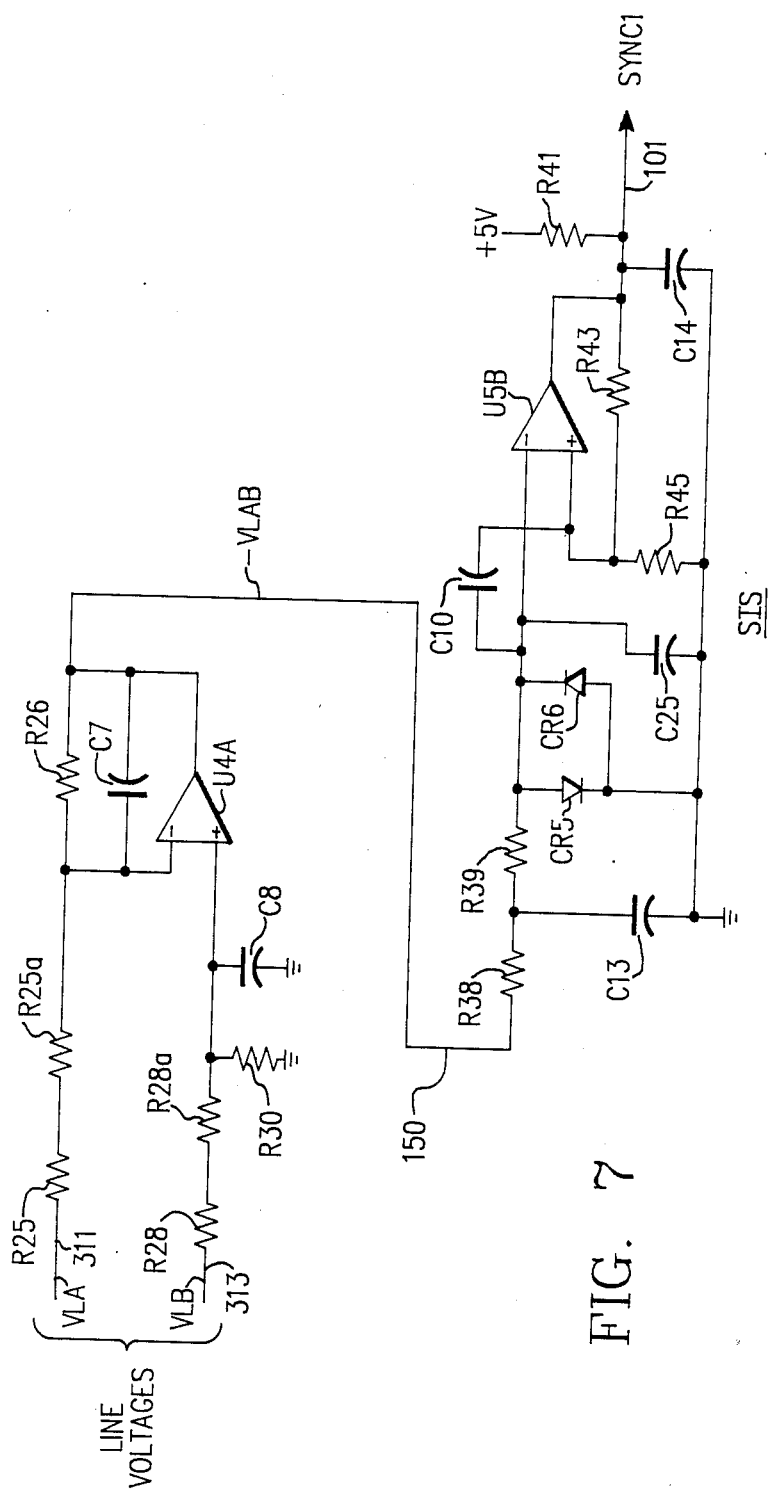
FIG. 7 is a hardware representation of circuitry for generating a signal like the SYNC signal of FIG. 4.

FIG. 3 shows the voltage sensing circuit VS responsive to the phase lines A,B,C, for generating a timing reference signal SYNC applied on line 101 to circuit GPG (The generation of the SYNC signal is illustrated in FIG. 7). This signal is inputted for synchronization into a phase-locked loop circuit PLL. The SYNC signal is a square wave characterizing a predefined electrical degree reference, typically about 80° delayed along the fundamental voltage wave VAB ($V_{AB}$ is illustrated under (a) on FIG. 4 as the line-to-line voltage, and the SYNC signal is shown under (b)). The phase-locked loop circuit PLL generates a control signal on line 102 to control the pulse repetition rate of a timer TMO, until the two signals of lines 101 and 104 are in phase.. Timer TMO responds to the signal of line 102 by outputting on line 103 equidistant pulses. These pulses are triggering an interval counter INTC, having the nature of a divide-by-6 circuit where the input is synchronized to the ½ count point, thus counting the succeeding intervals.

The phase-locked loop technique is well known. See for instance the circuit disclosed by Motorola Inc. in Bulletin MC 14046B (Series C 1978) under the title "Motorola/CMOS Integrated Circuits" page 7–128 and FIG. 3.

Accordingly, an output frequency is produced on line 103 which, in this instance, will be six times the input frequency of line 101. The zero count, or starting point of the INTC circuit, will be synchronized to the zero level or starting point of signal SYNC of line 101. All the pulses from timer TMO are evenly spaced. The phase-locked loop PLL and interval counter INTC are forcing timer TMO to produce six pulses on line 103 for every SYNC pulse appearing on line 101. Thus, each pulse of line 103 represents 60 degrees relative to the SYNC signal of line 101, namely 360 degrees divided by 6. Circuit INTC is counting the pulses received from timer TMO, thus, the number of sixty degree intervals in succession as they occur between zero and 360 degrees. The six time intervals are digitally identified as 0 to 5. Upon each pulse counted, a new count is generated on line 120 and applied to the distributor 107 to advance the firing sequence, thus every 60 degree interval (0 to 5).

Distributor 107 uses the k signal of line 110 to change the count used in the sequence for selecting a new pair of thyristors. The count being changed to the count provided by counter INTC k intervals earlier.

Timer TM1 is used to delay the enable (i.e. the advance of the count by the distributor) of the distributor. This delay is according to the calculation of a' at the start of each new interval. The sequencer function of distributor 107 is, thus, applying by lines 108 the firing enable to the gate drive 109 sequentially. The normal order of firing is according to the following illustrative table:

TABLE

| INTERVAL | 0 | 1 | 2 | 3 | 4 | 5 |
| --- | --- | --- | --- | --- | --- | --- |
| Gating of Thyristors | 1 6 | 3 6 | 3 2 | 5 2 | 5 4 | 1 4 |

Such normal firing order is delayed by distributor 107 by k intervals plus an α' delay, as just stated. It is understood that distributor 107 and gate drive 109 are part of the 6-SCR's Trigger Circuit 40 of FIG. 1.

Referring now to the multi-function section MFS of the microcomputer MCC, the various functions are performed under commands of an operator (or automatically if so installed) which are translated into a voltage reference (characterizing the delay angle α) appearing on line 4 at the input of section GPG of the microcomputer. As shown in FIG. 2, a calculator CLC responds to the voltage reference of line 4 by first deriving therefrom α, then, calculating two parameters k and α' which are defined by the following equation: $\alpha = k \times 60 + \alpha'$.

Figure 5:
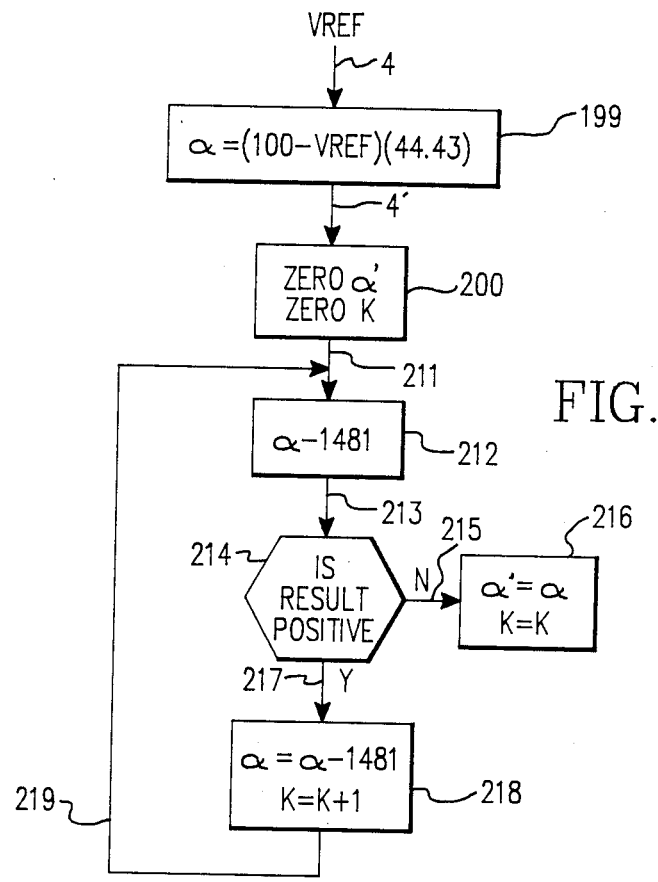
FIG. 5 is a flow chart characterizing the operation of the residual angle calculator which is part of the circuit of FIG. 3.
Figure 6A:
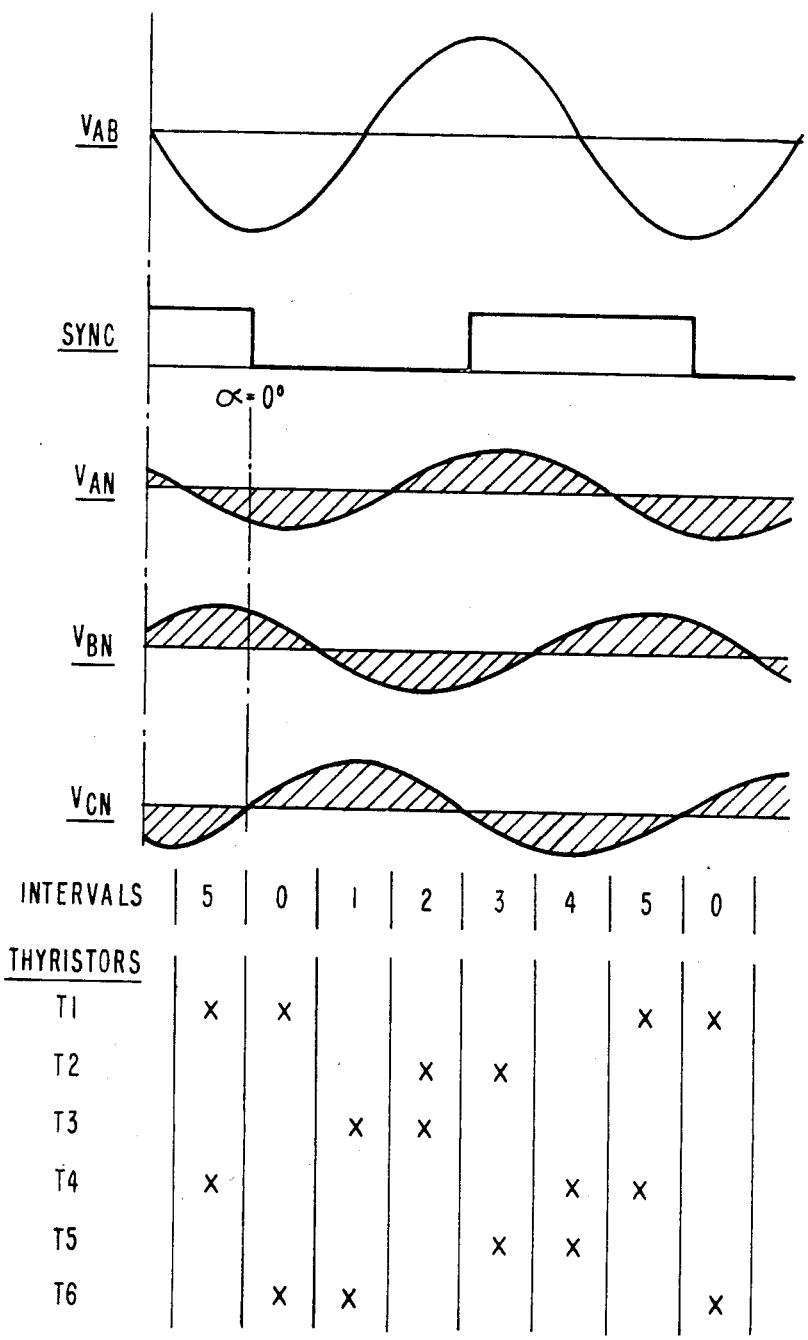
FIGS. 6A to 6E are curves illustrating the operation of the thyristors for delay angles of zero, 30,60,90 and 120 degrees, respectively.
Figure 6B:
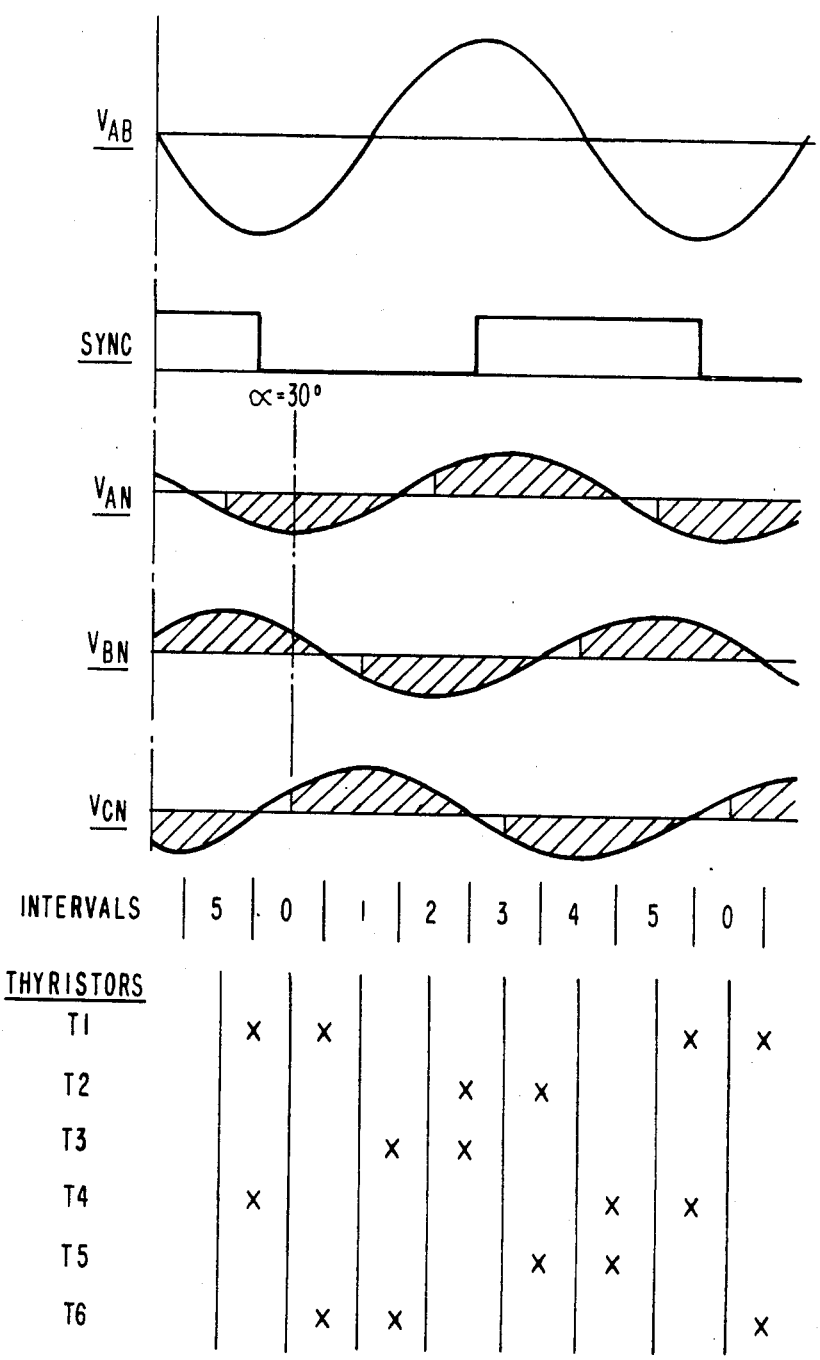
Figure 6C:
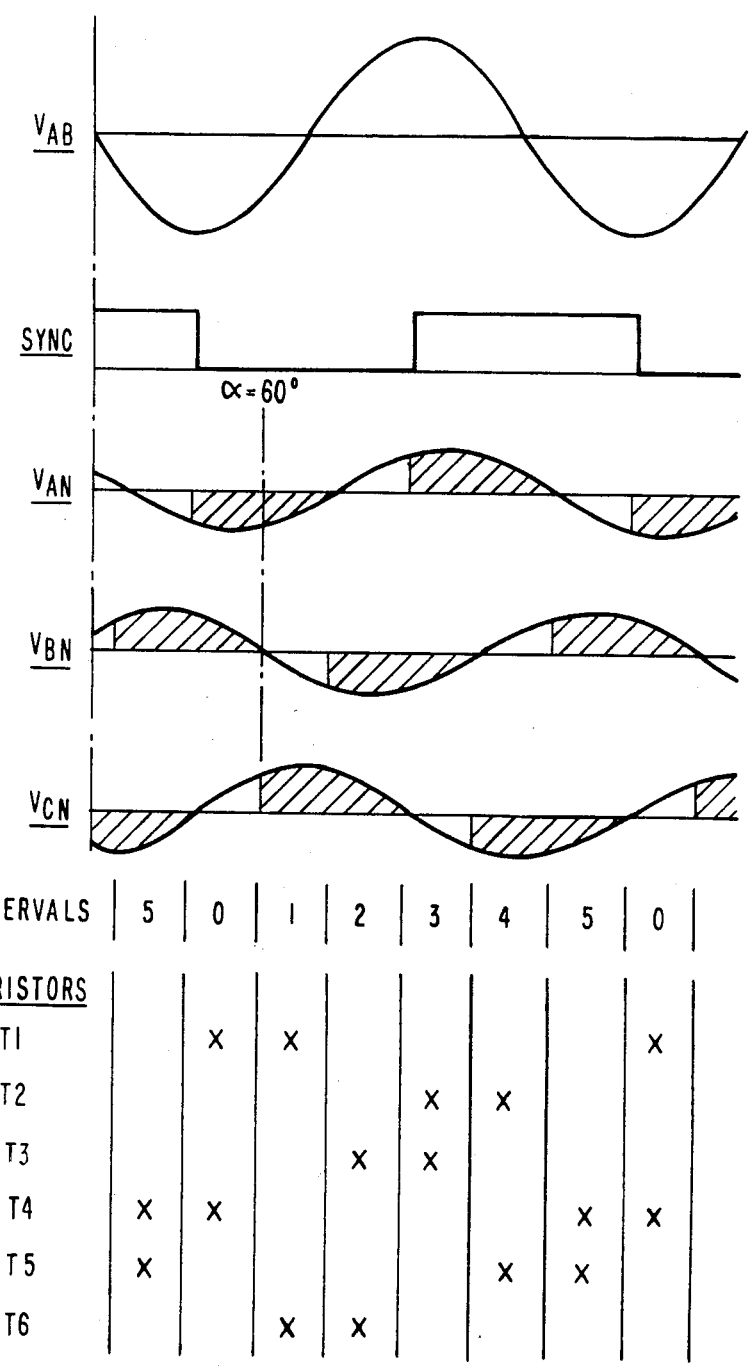
Figure 6D:
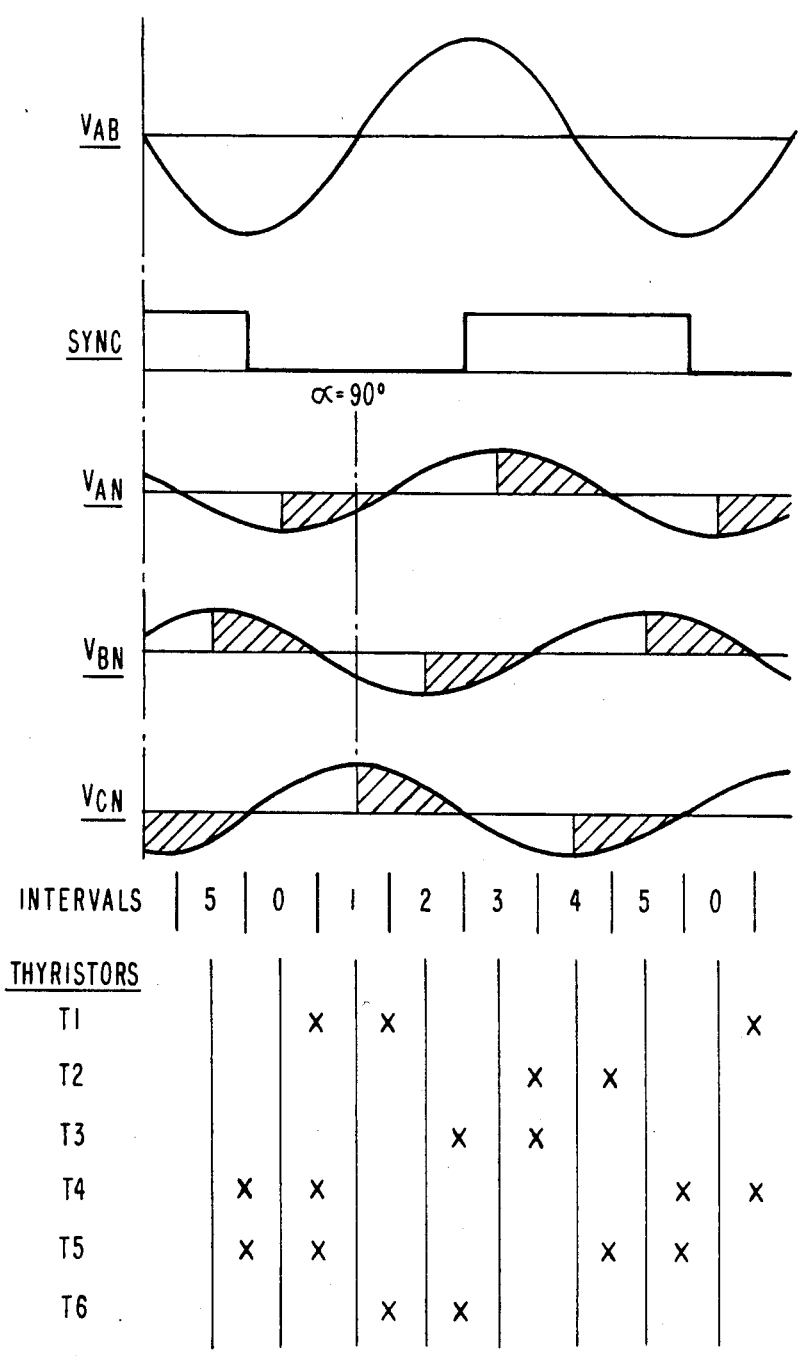
Figure 6E:
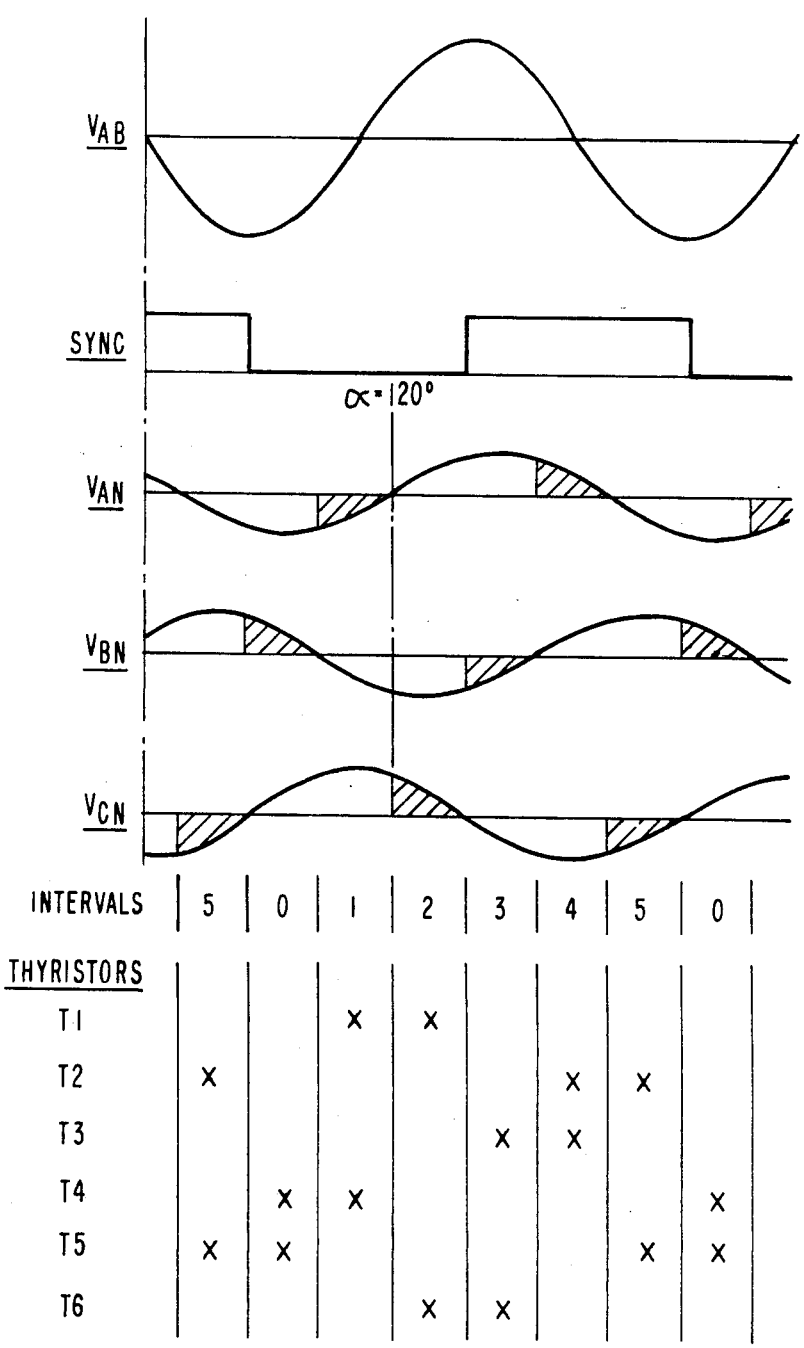

Referring to FIG. 5, a flow chart shows the conversion of the voltage signal of line 4 into the delay angle required by the system as effected by circuit CLC of FIG. 3. A count is derived related to the signal of FIG. 4 representing the amount of electrical degrees α to be run in order to reach the instant for which firing of the thyristor, which is next, should occur. To this effect, calculator CLC of FIG. 3 is arranged so that: for a zero voltage reference VREF at the input, on line 4, the output on line 4' is zero (meaning zero electrical degree); for full voltage on line 4 (100% for VREF) the output on line 4' is such that the number of electrical degrees corresponds to the end-stop position, namely 180 degrees or 3 times sixty degrees. Assuming the microprocessor operates with crystals at 6.4 Mhz frequency, and twelve such crystal pulses are used for a clock pulse of the timer defining a sixty degree time interval, then, there is a count of 1481 = 12/6.4 Mhz per interval. For 360 degrees, the total is 6(1481). Therefore, in percents, the value of the delay angle on line 4' is counted between the afore-stated upper and lower limits of the signal of line 4 as follows:

$$\alpha = (100 - VREF) \times 44.43$$

where 44.43 = 3(1481)/100.

Considering again equation $\alpha = k \times 60 + \alpha'$, as shown in FIG. 3, this equation expresses the value of angle α' counted as a residual angle within a sixty degree time interval partially filled when counting delay angle α. Thus, α is decomposed in so many intervals of 60° and a residual angle α'. Illustratively, FIG. 4 shows the 60° intervals initiated upon the verticals X0, X1, X2, ... X5, with the delay angle α assumed to be at line X within interval 1. Therefore, in this case the delay angle is $$\alpha = 1 \times 60 + \alpha'.$$

FIG. 4 shows the reference wave $V_{AB}$, the SYNC pulse, and the phase-to-neutral voltages $V_{AN}$, $V_{BN}$ and $V_{CN}$. With the assumed delay angle upon the occurrence of the electrical angle defined by line X, thyristor T6 is not fired in the sequence until interval 1, (not interval 0 as it would have been if delay angle α had pointed to interval 0, rather than 1). This shift of one interval in the firing sequence would have been effected by the count k=1 derived on line 110 and applied to distributor 107. Referring to FIG. 3, when a number of electrical angles corresponding to residual angle α', applied as a reference to timer TMI of FIG. 3, has elapsed after being initiated by line 105 as derived from timer TMO, timer TM1 instantaneously generates on line 100 an enable pulse which is applied to distributor 107. Firing of the thyristor selected by the distributor occurs (upon thyristor T6, in the instance of FIG. 4).

Referring again to the flow chart of FIG. 5, the operation of calculator CLC of FIG. 3 is as follows: In response to the value of the delay angle α on line 4', at 200 the system is set to zero for k and for α'. Then, from line 211, the system goes to block 212 where the value of one 60° interval is subtracted from the value of α in clock cycles. The microprocessor words with a 6.4 Mhz crystal. A clock signal is generated here using 1/12 of such crystal frequency, thus, twelve crystal clock pulses form one clock timer pulse or clock cycle. The delay angle is in clock cycles. Therefore, one clock cycle is 12/6.4 Mhz, whereas there are 1481 clock cycles in 60 electrical degrees, with a wave at 60 hz (asumed for $V_{AB}$). Accordingly, 1481 is the count representing a time interval (0,1,2,3 ... ). At 212 the system establishes the difference (α−1481). Thereafter, by line 213, at 214 the question is whether such difference is positive. If it is, this means that α is larger than a time interval and there is a residual angle α' to account for beyond one value of k=1. Therefore, after a YES on line 217, k (initially at zero) is increased by ONE at 218, and the difference is passed by line 219 for another calculation of (α−1481) within block 212. The process continues until the answer at 214 becomes a NO. Then, by line 215 the system goes to 216 where the last value of k is noted and the residual value of α' (namely the last difference) is also noted. These two values are applied, one on line 110 as the signal k, the other on line 106 as the signal α' for timer TM1. When timer TM1 detects that α' degrees have elapsed after the start of the interval (the start of the interval being indicated by line 105), the ENABLE signal appears on line 100 and is applied onto distributor 107.

FIGS. 6A to 6E show the adjustment of distributor 107 by line 110 to various values of α, chosen for the purpose of illustration to be successively: zero degree (FIG. 6A); 30 degrees (6B); 60 degrees (6C); 90 degrees (6D) and 120 degrees (6E).

FIG. 7 shows illustratively the derivation on line 150 of the line-to-line voltage $-V_{AB}$ in relation to lines 311 (for phase A) and 313 (for phase B). Line 150 is applied as an input to a squaring and inversion circuit SIS providing at its output 101 the SYNC signal of FIG. 4.

Figure 8A:
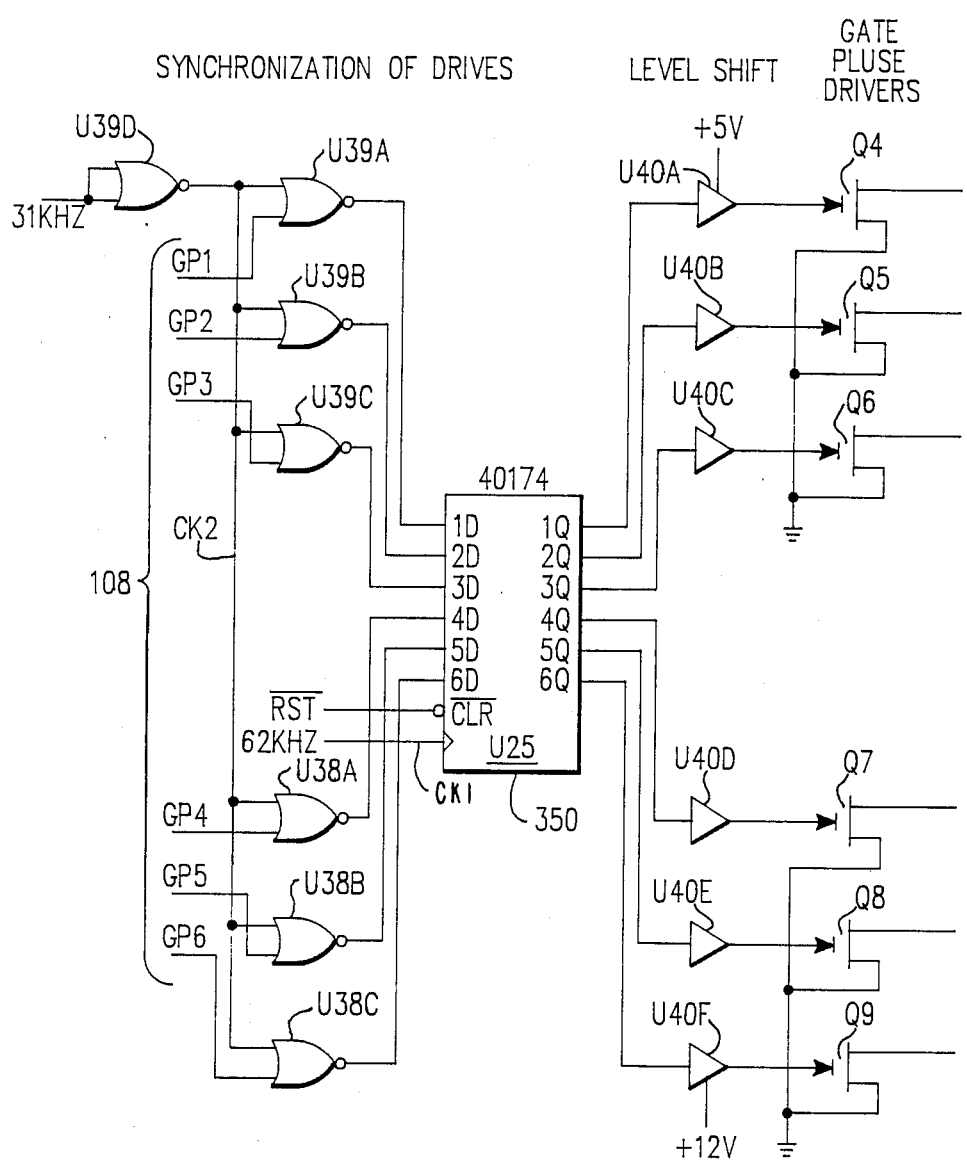
FIGS. 8A and 8B show a hardware representation of the gate drive which is enabled by the distributor of FIG. 3.
Figure 8B:
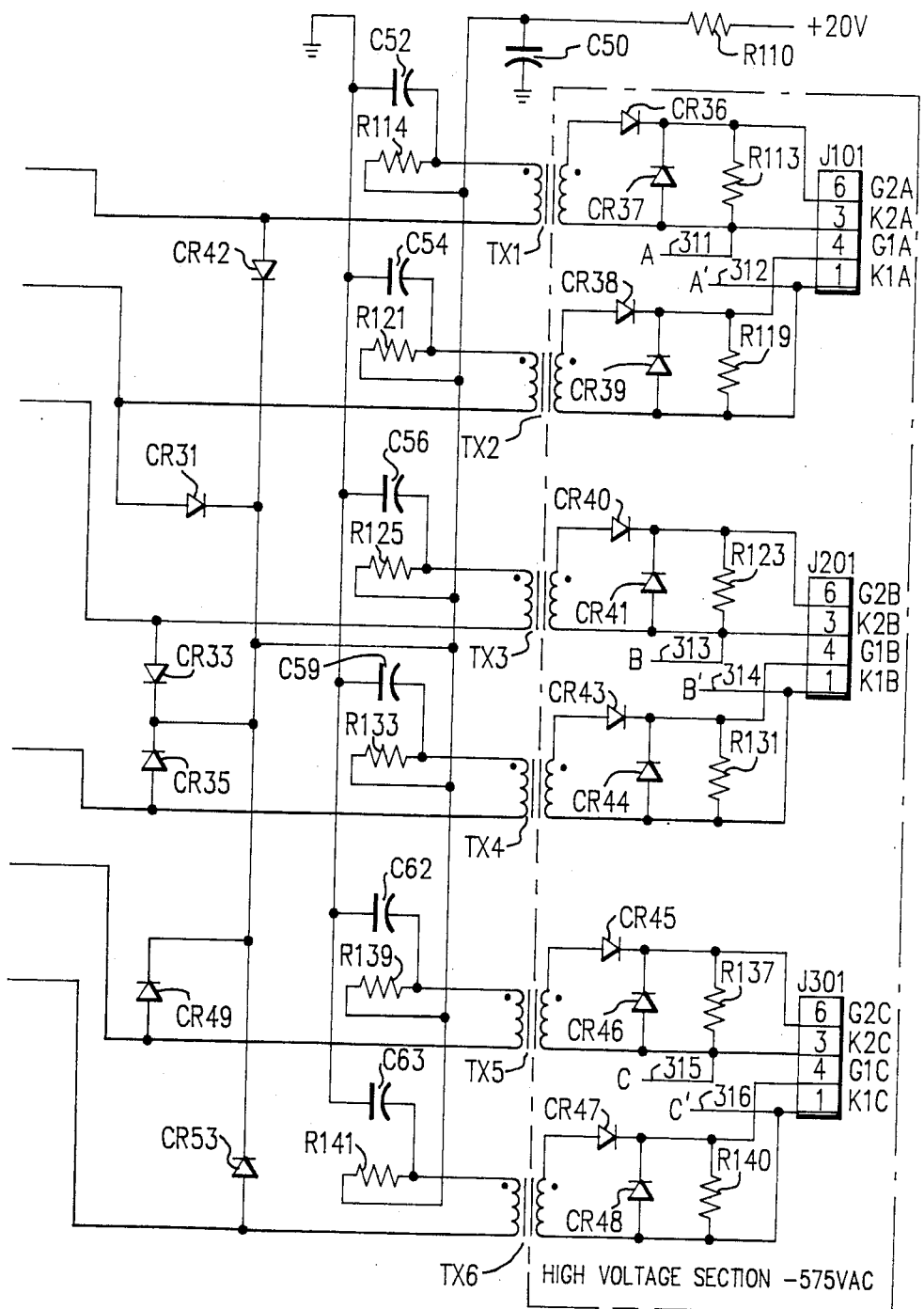

FIGS. 8A and 8B show the gating circuit 109. On lines 108 is applied a combination of signals from distributor 107 selecting one of the respective thyristors T1 to T6. By line CK2 is applied to respective NOR devices a clock signal (31 KHZ) used for the selection of the picket fence. The main clock is at 350 itself pulsed by a (62 KHZ) clock signal on line CK1. It activates via a levelling circuit within block 350 and gate pulse drivers, the thyristor which belongs to an antiparallel pair (T1 and T2 for line A between lines 312 and 311 like in FIG. 1; T3,T4 similarly for lines 314 and 313; T5,T6 for lines 316 and 315).

Referring to FIG. 3 and to a listing found in Appendix A and entitled TIMER 1 INTERRUPT ROUTINE, the operation of distributor 107 is illustrated by a computer routine as follows:

Each time the enable signal of line 100 is generated, it initiates the afore-stated routine. The OFFSET, or value of k, is derived and ascertained (see line 28 of the routine). At line 29 is determined whether the OFFSET (or value of K) is larger than 3. By so doing, the system knows whether the end-stop value of the delay angle has been reached. In such case the system is zeroed by disabling the gate drive outputs (line 30). Accordingly, the OFFSET is repositioned for a new running of intervals 0,1,2,3 (line 31). Lines 32 to 34 show how digitally the value of k for line 100 is arrived at. The principle consists in taking the INTERVAL COUNT as obtained from line 120 (routine line 34) and subtracting therefrom the value of the OFFSET. In the difference is positive, this is the value of the time interval which directs where to go for firing of the incoming thyristor. If the difference is negative, by adding 6 the same result is obtained for directing where to go for firing of the incoming thyristor. This is done from line 35 to line 42 in the routine. In line 42, the address is given as shown by A+PC (where A stands for the Accumulator and PC for the Program Counter determining the address). It is used for identifying the thyristor in the look-up table listed from line 45 to line 50 for the forward mode of operation. When this has been done, line 63 indicates that the distributor is enabling by lines 108 the gate drive 109 to control that particular thyristor.

A second listing is provided, found in Appendix B entitled TIMER 0 INTERRUPT ROUTINE. There, it is shown that the microcomputer operates the various functions for motor control (lines 12 to 19: protection, energy saver, DC brake, stability control, motor sequence control, deadman) during respective time intervals of 60 degrees, as synchronized with the AC lines, and that, upon each entry of any interval, the functions of blocks INTC and TM1 are initiated by the microcomputer. In other words, the multifunction management accommodates the operation of the GPG section of FIG. 1. This appears in particular from lines 10 and lines 66 in the routine.

```
           TIMER 1 INTERRUPT ROUTINE

LINE       SOURCE

3       ;     FILE:         TIMER1.SRC
      4       ;     DATE:         (08-08-84 V0.2)
      5       ;     PROGRAMMER:   R.T.ELMS
      6       ;     VERSION:      V0.6    02-08-85
      7       ;
      8       ;                   (ENABLE:LINE 100)
      9       ;THIS ROUTINE DOES:
     10       ;      TIMING OF GATE DRIVE TRIGGER PULSE OCCURANCE
     11       ;      (70 DEGREE HARDWARE LAG IN EXTERNAL SYCHRONIZATION)
     12       ;      SELECTION OF APPROPRIATE GATES TO BE DRIVEN
```

```
13    ;         OUTPUT OF GATE DRIVE CONTROL SIGNALS
14    ;
15              EXTRN    DATA(LSTRIG, GPXCNT)
16              EXTRN    BIT(BRAKE, FWD_REV)
17    ;
18              PUBLIC   TIMR01
19    ;
20              CSEG
21              ORG      0D80H
22    ;
23    TIMR01:   CLR      EA              ;DISABLE INTERRUPTS
24              PUSH     PSW             ;SAVE FLAGS AND ACCUMULATOR
25              PUSH     ACC
26              CLR      ET1             ;STOP AND DISABLE TIMER1
27              CLR      TR1
28              MOV      A,LSTRIG+1      ;GET OFFSET (M.S. NIBBLE) K(l 110)
29              CJNE     A,#30H,INHIB    ;IS OFFSET => 3, IF TRUE
30    INHIB:    JNC      DISABL          ;DISABLE GATE DRIVE OUTPUTS
31              SWAP     A               ;REPOSITION OFFSET TO COMBINE WITH
32              CPL      A               ;TAKE TWO'S COMPLEMENT
33              INC      A               ;OFFSET= 0(0), F(1), E(2), D(3)
34              ADD      A,GPXCNT (l 120) ;INTERVAL COUNT
35              ANL      A,#0FH          ;MASK OUT RESULT
36              CJNE     A,#10,LESSTN    ;FORCE RESULT TO BE [0,1,2,3,4,5]
37    EQLGRT:   SUBB     A,#10           ;RESULT WAS => 10 SO SUBTRACT 10
38              SETB     C               ;DON'T WANT TO GET CAUGHT IN A LOOP
39    LESSTN:   JNC      EQLGRT          ;NO CARRY ON COMPARE IF ' => '
40              ADD      A,#2            ;BYPASS 'SJMP' FOR CODE LOOKUP
41              JB       FWD_REV,REVDRI
42              MOVC     A,@A+PC         ;GET 'GATE PULSE CODE'(1=NO GATE PULSE)
43              SJMP     GATEDR          ;M.S.BIT              L.S.BIT
44    LOOK-UP TABLE:                     ;(DMOUT)              (ALARM)
45         0    DB       10111101B       ;          /                \
46         1    DB       10110111B       ;    (GP6)(GP5)(GP4)(GP3)(GP2)(GP1)
47         2    DB       11110011B       ;NOTE: PGX= 1 IS 'NO GATE PULSE'
48         3    DB       11011011B       ;THESE ARE 'FORWARD' GATE DRIVES
49         4    DB       11001111B
50         5    DB       11101101B
51    ;
52    REVDRI:   MOVC     A, A+PC         ;'REVERSE' GATE DRIVES
53    LOOK-UP TABLE: SJMP GATEDR
54              DB       11001111B
55              DB       11011011B
56              DB       11110011B
57              DB       10110111B
58              DB       10111101B
59              DB       -11101101B
60    ;
61    GATEDR:   JNB      BRAKE,DRIVE     ;DC BRAKE USES GP1 AND GP4 ONLY
62              ORL      A,#0EDH         ;THEREFORE MASK OUT OTHERS (0= ENABLE)
63    DRIVE:    MOV      P1,A (l 108)    ;OUTPUT GATE DRIVE CONTROL SIGNALS
64              SJMP     DONET1          ;GO AND RETURN FROM INTERRUPT
65    DISABL:   MOV      P1,#0FFH        ;OUTPUT CONTROLS TO DISABLE GATE DRIVES
66    DONET1:   POP      ACC             ;RESTORE FLAGS AND ACCUMULATOR
67              POP      PSW
68              SETB     EA              ;ENABLE INTERRUPTS
69              RETI                     ;RETURN FROM INTERRUPT
70              END
```

TIMER 0 INTERRUPT ROUTINE

LOC  OBJ       LINE    SOURCE

```
 3    ;   FILE:        TIMER0.SRC    (IG42 ENSAV 01)
 4    ;   DATE:        07-25-84
 5    ;   PROGRAMMER:  R. T. ELMS
 6    ;   REVISION:    VO.4   12-03-84
 7    ;
 8    ;
 9    ;THIS ROUTINE DOES:
10    ;    INITIALIZATION OF TIMERS 0 AND 1
11    ;    UPDATE OF INTERVAL COUNT
12    ;    READS INPUTS AND JUMPERS
13    ;    READS CURRENT AND VOLTAGE
14    ;    DOES PROTECTION
15    ;    DOES ENERGY SAVER CONTROL FUNCTION
16    ;    DOES DC BRAKE INTERFACE
17    ;    DOES STABILITY CONTROL
18    ;    DOES MOTOR SEQUENCE CONTROL
19    ;    SERVICES DEADMAN
20    ;
21    ; 30 INSTRUCTION CYCLES REENABLE GATE TIMER
22    ;
```

```
 23  ; INTERVAL COUNT         TREF    CONDITION OR TASK
 24  ;_____
 25  ; "X"                     0      OUT OF SYNC
 26  ;  0                      1      IN SYNC
 27  ;  1                      1       "
 28  ;  2                      1       "
 29  ;  3                      1       "
 30  ;  4                      1       "
 31  ;  5                      1      CLEAR SYNC
 32  ;  6                      1      JUST REINITIALIZE TIMER0 AND EXIT
 33  ;  7                      1      OUT OF SYNC, CLEAR "TREF"
 34  ;
 35       EXTRN   CODE(ILIMIT,REGMVL,DELAYS,SQUARE,ADTALY,FRACT,VDMLTS,SCRP10)
 36       EXTRN   CODE(RMPTBL)
 37  ;
 38       EXTRN   DATA(OPXCNT,LSTRIG,TLOREL,THOREL,NUTRIG,GBUFO,LONGCU,OFLAGS)
 39       EXTRN   DATA(GBUF1,GBUF2,GBUF3,MOHEAT,SCRHET,RANGE,LONGVO,GNDTIM)
 40       EXTRN   DATA(DMELLT,LMCURR,TEMPO,SECTMR,JAMTIM,PLOSST,SFLAG1)
 41       EXTRN   DATA(PMCURR,LMVOLT,RMPINC,PMVOLT,SCRALE,VMULT,LOMVLT,SFLAG2)
 42       EXTRN   DATA(RMPLMT,MSCALE,CLIMIT,ENERGY,RMPVAL,INSTEP,JAMLMT,SFLAG3)
 43       EXTRN   DATA(HOTSCR)
 44  ;
 45       EXTRN   BIT(SYNC,TREF,NPH_GLOW,STR_CLAS,FRAME,OVERLOAD,SER_FA,RESETYPE)
 46       EXTRN   BIT(CURR_LIMIT,DWELL,RAMP,FLAG3,OVERTMP,PHASLT,SCRCHK,FLAG2)
 47       EXTRN   BIT(TEST,FWD_REV,FLAG0,FLAG1,FLAG4,FLAG5,FLAG6,FLAG7,UNBALANCE)
 48       EXTRN   BIT(SCR_A,SCR_B,SCR_C,POLE,PH_REV,READY,MOTORV,GROUND,BRAKON)
 49       EXTRN   BIT(ENG_SAV,HERTZ,BRAKE,JAMTRP,RAMP_TYP,TACH,TRIP,GRD)
 50       EXTRN   BIT(DECEL,RUN,INSTANTANEOUS,EXTEND_ACC,OVERCURRENT)
 51       EXTRN   BIT(UNDER_VOLT)
 52  ;
 53       PUBLIC  TIMR00
 54       ALARM   BIT   P1.0
 55  ;
 56       CSEG
 57       ORG   1400H
 58  ;
 59  TIMR00: CLR   EA              ;DISABLE INTERRUPTS
 60          PUSH  PSW             ;SAVE FLAGS AND REGISTER BANK
 61          PUSH  ACC             ;SAVE ACCUMULATOR
 62          SETB  RS0             ;USE REGISTER BANK 1
 63          CLR   RS1
 64          CLR   F0              ;F0= VALID INTERVAL FLAG
 65          INC   OPXCNT          ;NEXT INTERVAL (INTC)
 66          ANL   OPXCNT,#0EFH
 67          ANL   TCON,#2FH       ;STOP TIMERS AND CLEAR TIMER FLAGS
 68          MOV   R0,TL0          ;GET TIMER 0 OVERRUN TIME
 69          MOV   R1,TH0
 70          MOV   A,LSTRIG        ;GET GATE TRIGGER POINT L.S. BYTE
 71          ADD   A,R0            ;CORRECT FOR OVERRUN OF TIMER 0
 72          MOV   TL1,A           ;AND RELOAD TIMER 1
 73          MOV   A,NUTRIG        ;NOW DO M.S. BYTE OF TIMER 1
 74          MOV   LSTRIG+1,A
 75          ORL   A,#0F0H         ;BLANK INTERVAL COUNT PORTION
 76          ADDC  A,R1
 77          MOV   TH1,A           ;SAVE RESULT
 78  STRT1:  JNB   SYNC,NEXT       ;NO SYNC MEANS TIMING NOT SYNCHRONIZED
 79          SETB  TR1             ;START TIMER 1
 80  NEXT:   MOV   A,OPXCNT        ;GET INTERVAL COUNT
 81          ANL   A,#0FH          ;MASK OUT FLAG BITS
 82          CJNE  A,#5H,RELOAD    ;TEST FOR LAST INTERVAL(C=SYNC,TREF)
 83          SETB  TREF            ;THIS IS A SYNC WINDOW
 84          SJMP  RELOD4
 85  RELOAD: CJNE  A,#6,RELOD3     ;JUMP IF TIMER DID NOT OVERRUN
 86          SETB  F0              ;NOT A VALID INTERVAL
 87  RELOD3: CJNE  A,#7H,RELOD4
 88          ANL   OPXCNT,#30H     ;SYSTEM NOT IN LINE SYNC, ZERO COUNT
 89          ORL   P1,#07EH        ;STOP GATE DRIVE PULSES
 90          CLR   TREF
 91          CLR   SYNC
 92          CLR   ET1
 93  RELOD4: MOV   A,TLOREL
 94          ADD   A,R0
 95          JNC   RELOD1
 96          INC   R1
 97  RELOD1: ADD   A,#32           ;COMPENSATE FOR 32 LOST INSTR. CYCLES
 98          MOV   TL0,A
 99          MOV   A,R1
100          ADDC  A,THOREL
101          MOV   TH0,A
102          SETB  TR0
103  ;
104  ;*******************************************************************
105  ;
106  INPUTS: PUSH  B               ;SAVE ENTRY VALUE OF "B" REGISTER
107          PUSH  DPH             ;SAVE M.S. BYTE DATA POINTER
108          MOV   DPH,#23H
109          MOV   A,#0DH          ;TIMING TEST
110          MOVX  @DPTR,A         ;SIGNAL P22.6
111          SETB  EA
112  ;
113  ;
114  ;************* DEADMAN SERVICE ROUTINE ************************
115  ;
116  DEADMN: JB    P3.4,NOTYET     ;"DMIN" (BAR) ACTIVE?
117          CLR   P1.7            ;YES, TOGGLE "DMOUT"
118          NOP
119          SETB  P3.4            ;MAKE SURE "DMIN" IS AN INPUT
120          NOP
121  NOTYET: SETB  P1.7            ;DONE
122          JB    F0,NOTRDY       ;NOT A VALID INTERVAL
123          JNB   READY,NOTRDY
```

```
1478 300020    F  124              JNB      SYNC,NOTRDY
                  125     ;
                  126     ;********************************************************
                  127     ;
                  128     ;                 AC INPUT
                  129     ;
147B 758360       130     ACINPT:  MOV      DPH,#60H
147E E0           131              MOVX     A,@DPTR
147F 30E002       132     RUN_ST:  JNB      ACC.0,HETBNK
1482 0500      F  133              INC      GBUF0
1484 30E502       134     HETBNK:  JNB      ACC.5,XTRM1
1487 0500      F  135              INC      GBUF1
1489 30E602       136     XTRM1:   JNB      ACC.6,XTRM2
148C 0500      F  137              INC      GBUF2
148E 30E702       138     XTRM2:   JNB      ACC.7,ACEND
1491 0500      F  139              INC      GBUF3
                  140     ;
                  141     ;************* CHECK FOR RUN STATE AN SERVICE INTERVALS ***************
                  142     ;
1493 300008    F  143     ACEND:   JNB      RUN,OFFSTA    ;JUMP IF NOT IN RUN MODE
1496 021680       144              LJMP     RUNSTA
1499 D200      F  145     LOSTSY:  SETB     TEST
149B 43907E       146     NOTRDY:  ORL      P1,#07EH      ;DISABLE GATE PULSES
149E 0218B9       147              LJMP     DONETO
14A1 C28E         148     OFFSTA:  CLR      TR1           ;DISABLE GATE PULSE TIMER
14A3 C2A8         149              CLR      ET1
14A5 43907E       150              ORL      P1,#7EH       ;DISABLE GATE PULSES
14A8 E4           151              CLR      A
14A9 F58B         152              MOV      TL1,A
14AB F58D         153              MOV      TH1,A
14AD F500      F  154              MOV      LSTRIG,A
14AF 44C0         155              ORL      A,#0C0H
14B1 F500      F  156              MOV      NUTRIG,A
14B3 F500      F  157              MOV      LSTRIG+1,A
14B5 3000E1    F  158              JNB      SYNC,LOSTSY   ;WAIT UNTIL SYNCH TO LINE
14B8 758360       159              MOV      DPH,#60H      ;READ "FAST INPUTS"
14BB E0           160              MOVX     A,@DPTR
14BC A2E1         161              MOV      C,ACC.1       ;CARRY= "SYNC2"
14BE B3           162              CPL      C
14BF FF           163              MOV      R7,A
14C0 E500      F  164              MOV      A,OPXCNT
14C2 540F         165              ANL      A,#0FH
14C4 704E         166              JNZ      TEST1
14C6 CE           167              XCH      A,R6          ;THIS IS INTERVAL 0
```

I claim:

1. In a digital pulse generator for gating a plurality of thyristor switches sequentially for conduction under a three-phase AC power supply by gate pulses under a predetermined firing angle α, including phase-locked loop means coupled to said AC power supply for deriving an instantaneous electrical angle representative signal; the combination of:
    computer means responsive to said predetermined firing angle α for calculating α=K.(60)+α', where K is an integer number of 60 electrical angles and α' is a residual angle in excess of such K.(60) number of electrical angles in said predetermined firing angle α, and for deriving a first control signal representative of said integer number K and for deriving a second control signal representative of said residual angle α';
    first timer means responsive to said instantaneous electrical angle representative signal for repeatedly establishing a running count through a sixty degrees time interval, each such time interval corresponding to a thyristor switch in the sequence of conduction thereof;
    counter means responsive to said first timer means for counting successive said time intervals;
    distributor means responsive to said counter means for selecting said thyristor switches sequentially and accordingly;
    second timer means responsive to said running count and to said second control signal for enabling said distributor means to gate a selected thyristor switch; with said distributor means being controlled by said first control signal to shift the order of gating in said sequence by an amount in relation to said integer number.

2. The digital pulse generator of claim 1 with said AC power supply being connected as an input to an AC/DC converter including said thyristor switches.

3. The digital pulse generator of claim 1 with said AC power supply being outputted by an inverter including said thyristor switches.

4. The digital pulse generator of claim 3 with said AC power supply being inputted into an AC motor.

5. The digital pulse generator of claim 4 with said computer means being responsive to said AC power supply for selecting and performing at least one of a plurality of control functions for the motor.

6. The digital pulse generator of claim 5 with said control functions including means for adjusting the firing angle α to start-up the motor.

7. The digital pulse generator of claim 5 with said control functions including means for adjusting the firing angle α to provide energy saving in the motor operation.

* * * * *